United States Patent Office 3,767,771
Patented Oct. 23, 1973

3,767,771
PREPARATION OF FAUJASITE-TYPE ZEOLITES
Jean-Louis Guth, Toulouse, Albert Pereyron, Brunstatt, and Raymond Wey, Mulhouse, France, assignors to Azote et Produits Chimiques S.A., Paris, France
No Drawing. Filed Sept. 8, 1971, Ser. No. 178,794
Claims priority, application France, Sept. 8, 1970, 7032513
Int. Cl. C01b 33/28
U.S. Cl. 423—329
8 Claims

ABSTRACT OF THE DISCLOSURE

Crystalline zeolites of the faujasite-type containing $Na^+$ and $K^+$ cations are produced by a process wherein a gel containing all of the necessary alumina is prepared, amorphous silica is added to the gel in an amount of at least 0.5 mole of amorphous silica per mole of alumina, and the resultant mixture crystallized. The zeolite products have a high $SiO_2/Al_2O_3$ ratio and excellent thermal stability and can be used as molecular sieves and catalyst supports.

BACKGROUND OF THE INVENTION

This invention relates to a novel and improved process for preparing zeolites of the faujasite type containing $Na^+$ and $K^+$ cations, and to the zeolites obtained thereby.

It is known that zeolites in general are natural crystalline aluminosilicates consisting of a three-dimensional framework of $SiO_4$ and $AlO_4$ tetrahedra, the oxygen atoms being common to two tetrahedra. The negative charges in excess due to the presence of $AlO_6$ ions in the tetrahedra are balanced by alkali metal or alkaline-earth metal cations. Owing to the regular arrangement of the $SiO_4$ and $AlO_4$ tetrahedra, the framework of the zeolites comprises a combination of pores and cavities of molecular dimensions inter-linked by means of channels which contain water as well as compensating cations. By partially dehydrating the zeolites, activated zeolites are obtained which can selectively adsorb the molecules retained within the interstitial spaces and compatible with the dimension of the channels. It is this characteristic property that has led to their designation as molecular sieves.

The general chemical formula of the zeolites is $$M_2/nO:Al_2O_3:ySiO_2:zH_2O$$

wherein M is at least one metal, and n its valence, y and z representing the number of moles of $SiO_2$ and $H_2O$ respectively.

Molecular sieves are used in many industrial processes: ion exchange, selective adsorption, catalytic conversion of organic molecules, and for the conversion of hydrocarbons.

The present invention relates to the preparation of a particular type of a zeolite having the framework of a natural faujasite, that is a lattice of the cubic type with centered faces with a parameter $a_0$ comprised between 24.5 and 25 A., and is particular to the preparation of a faujasite containing $K^+$ ions and $Na^+$ ions which is rich in silica.

Heretofore the zeolites of such type were prepared in a two-stage process. In the first stage a faujastie containing $Na^+$ ions only is prepared by crystallization of mixtures containing $SiO_2$, $Al_2O_3$, $Na_2O$ and $H_2O$, in the second stage the $K^+$ ions are introduced by exchange of cations. This two-stage operation is, however, long and complicated. It has been proposed, therefore, to prepare faujasites containing $Na^+$ and $K^+$ by direct synthesis, but so far the faujasites obtained have a very low $SiO_2/Al_2O_3$ ratio.

SUMMARY OF THE INVENTION

An object of this invention is to provide a novel and improved process for producing faujasite-type zeolites.

Another object is to provide faujasites having a high $SiO_2/Al_2O_3$ ratio and which contain sodium and potassium ions.

Upon further study of the specification and appended claims, other objects and advantages of this invention will become apparent.

To attain these objects, there is provided an improved and a direct method for producing faujasites containing $Na^+$ ions and $K^+$ ions having the following molar composition after dehydration:

$$1\pm0.15[xK_2O; (1-x)Na_2O]; Al_2O_3; 2.9\pm0.6SiO_2$$

the value of $x$ varying between 0.1 and 0.8.

The silica content of these faujasites is thus higher than zeolites of the same type having a molar ratio no higher than 2.25 and obtained heretofore by direct synthesis.

According to the process of the invention, the zeolites are crystallized from an amorphous mixture containing $SiO_2$, $Al_2O_3$, $Na_2O$, $K_2O$ and $H_2O$ expressed in molar ratios comprised within the limits given in Table I:

TABLE I

| Molar ratios | General limits | Preferred limits |
|---|---|---|
| $SiO_2/Al_2O_3$ | 2.5–8 | 3–6 |
| $Na_2O+K_2O/Al_2O_3$ | 3–8 | 3.5–6.5 |
| $K_2O/Na_2O+K_2O$ | 0.05–0.7 | 0.1–0.6 |
| $H_2O/Al_2O_3$ | 75–300 | 100–200 |

As can be observed the zeolites according to the invention, although rich in silica, are prepared from amorphous mixtures having a low silica content. Table I shows that the molar ratio $SiO_2/Al_2O_3$ does not exceed 8:1.

According to this invention, the preparation of the amorphous mixture comprises: forming a gel of sodium and/or potassium aluminosilicate from a mixture having a composition expressed in terms of molar ratios, as follows and containing the total quantity of alumina necessary for the amorphous mixture preparation.

TABLE II

| Molar ratios | General limits | Preferred limits |
|---|---|---|
| $SiO_2/Al_2O_3$ | 1.5–3 | 2–2.5 |
| $Na_2O+K_2O/Al_2O_3$ | 0.8–3.5 | 1–3 |
| $H_2O/Al_2O_3$ | 75–300 | 100–200 |

To form this first gel, an aqueous solution of silicate is prepared by dissolving silica with sodium hydroxide and/or potassium hydroxide, or by using previously prepared solutions of sodium silicate or potassium silicate, e.g., water glass. While the resultant silicate solution is being agitated, there is then added an aqueous solution of sodium aluminate in proportions within the limits given in Table II. Preferably the aluminate solution is added at ambient temperature, e.g., about 20–25° C. The mixture is agitated so that gel is homogeneous. It can then be sent directly to the second step of the operation. Preferably, though, the gel is filtered, washed and dried at a temperature lower than 80° C.; then stored until its utilization in the second step.

In the second step the gel formed in the first step is modified so as to bring its composition within the limits given in Table I. The $SiO_2$ level is increased by adding amorphous silica. Generally amorphous silica having a particle size of less than 100 microns is added, silica having a higher particle size being generally not reactive enough. When using such higher particle size silica faujasite often cannot be crystallized from the amorphous mixture. The reactivity of amorphous silica increases with decreasing particle size and silica having a particle size less than 50 microns are preferably used. Any amorphous silica containing no other impurity than water can be utilized. At least 0.5 mole $SiO_2$ per mole $Al_2O_3$ is added in order that faujasite rich in silica crystallizes from the amorphous mixture.

Water, sodium hydroxide and potassium are optionally added in required quantity.

It must be noted that no alumina is added as the total quantity necessary has been introduced in the first step.

The resultant amorphous mixture obtained having the composition within the limits given in Table I is then treated to transform it into crystallized zeolite.

This transformation is generally conducted at a temperature comprised between 20 and 105° C. Thus it can be conducted at ambient temperature without any heating, but at 20° C. it takes 15 to 80 days for the zeolite to crystallize. Lower temperatures would require still longer crystallization times. With higher temperatures, the period is shorter; for example it is 3 to 24 hours at 95° C. When the crystallization is performed at a temperature higher than 30° C., it is preferred that the amorphous mixture be maintained for 24 to 72 hours at 20 to 30° C. before it is heated up to the crystallization temperature. In this way the resultant product is purer and better crystallized. Agitation is unnecessary during crystallization.

When crystallization is complete, the resultant crystallized precipitate is filtered out and washed with water until the wash water has a pH lower than 10, and then dried, for example by heating at a temperature of 50° C.

To activate the zeolite it is heated to a temperature between 250 and 600° C., preferably 340 to 360° C., under a pressure below $10^{-1}$ mm. Hg.

The faujasites obtained by the process of the invention being rich in silica have a high thermal stability. Thus, they have particular application as adsorbent agents or for preparing catalysts.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

A solution of sodium silicate was prepared with 4.7 g. of amorphous silica (containing 10.4% of water), 1.4 g. of NaOH and 42 ml. of water. To this solution there was added under agitation (no heating), a solution of sodium aluminate containing 10.4 g. of commercial sodium aluminate (composition by weight: $Al_2O_3$=34.5%;

$Na_2O$=49.5%;

$H_2O$=16.0%) and 45 ml. of water. The resultant gel had the following composition expressed in terms of molar ratios:

$SiO_2/Al_2O_3$=2; $Na_2O/Al_2O_3$=2.8; $H_2O/Al_2O_3$=140

After addition of 2.35 g. of amorphous silica having particles smaller than 50 microns and of 8.6 g. of KOH containing 15% of water, the molar ratios of the gel were:

$SiO_2/Al_2O_3$=3; $Na_2O+K_2O/Al_2O_3$=4.7;
$K_2O/K_2O+Na_2O$=0.4; $H_2O/Al_2O_3$=145

The mixture was placed in a Pyrex glass tube and kept at 30° C. for 60 days with intermittent agitation. After filtering and drying, the faujasite obtained was characterized by an X-ray diffraction diagram as shown in Table III, in comparison to natural calcium faujasite of Kaiserstuhl.

TABLE III

| (Hkl.) | Synthetic K, Na faujasite | | Kaiserstuhl natural calcium faujasite | |
|---|---|---|---|---|
| | I/Io | d(A.) | I/Io | d(A.) |
| 111 | vS | 14.35 | vS | 14.40 |
| 220 | mS | 8.82 | m | 8.78 |
| 311 | m | 7.49 | w | 7.49 |
| 222 | | | vw | 7.17 |
| 331 | mS | 5.74 | mS | 5.70 |
| 422 | | | vw | 5.06 |
| 333 and 511 | w | 4.80 | m | 4.77 |
| 440 | w | 4.41 | s | 4.39 |
| 531 | vw | 4.22 | | |
| 620 | w | 3.93 | w | 3.91 |
| 533 | w | 3.80 | S | 3.78 |
| 444 | | | vw | 3.58 |
| 771 and 551 | | | wm | 3.47 |
| 642 | S | 3.342 | vS | 3.316 |
| 731 and 553 | vw | 3.258 | w | 3.230 |
| 733 | w | 3.045 | mw | 3.025 |
| 822 and 660 | mw | 2.942 | mS | 2.919 |
| 751 and 555 | mw | 2.882 | S | 2.862 |
| 840 | m | 3.792 | wm | 2.769 |

NOTE.—vS=Very strong; S=Strong; mS=Middle to strong; m=Middle; mw=Middle to weak; w=Weak; vw=very weak.

Upon chemical analysis, it was determined that the faujasite of this example has the following molar ratio:

0.54 $Na_2O$; 0.49 $K_2O$; 1.0 $Al_2O_3$; 2.7 $SiO_2$; 5.1 $H_2O$

The zeolite of the example was then activated and dehydrated by heating at 350° C. under a pressure of $10^{-2}$ mm. Hg.

The resultant zeolite was tested for adsorption efficiency, the results being as follows: The quantity of water adsorbed at 25° C. under a water pressure of 13.5 mm. Hg was 26 g. of water per 100 g. of dehydrated zeolite. The quantity of n-hexane adsorbed at 25° C. under a n-hexane partial pressure of 102 mm. Hg was 10 g. of n-hexane for 100 g. of dehydrated zeolite.

Example 2

At ambient temperature and under strong agitation, a solution of aluminate containing 520 g. of sodium aluminate (composition $Al_2O_3$=34.5%; $Na_2O$=49.5%; $H_2O$=16%) and 2.25 liters of water, was poured into a solution of silicate containing 230 g. of amorphous hydrated silica (10.4% by weight water) and 2.1 liters of water. The thus-obtained gel was allowed to stand for 8 hours, then filtered and washed three times with water, the gel being put into suspension in water between each wash. After drying at 30° C., the composition of the gel was (in weight percent).

$SiO_2$: 92.9%; $Al_2O_3$: 22.6%; $Na_2O$: 15.1%; $H_2O$: 28.6% which corresponds to the following molar ratios:

$SiO_2/Al_2O_3$=2.5; $Na_2O/Al_2O_3$=1.1; $H_2O/Al_2O_3$=7.2

11.3 g. of this dried gel were mixed with 4.2 g. of amorphous silica having a particle size of less than 50 microns, 28 ml. $H_2O$, 29 ml. of 5 N NaOH solution and 10 ml. of 5 N KOH solution. The molar ratios of the resultant mixture were:

$SiO_2Al_2O_3$=5; $Na_2O+K_2O/Al_2O_3$=5;
$K_2O/K_2O+Na_2O$=0.2; $H_2O/Al_2O_3$=150

The mixture was maintained at 25° C. for 40 hours. It was then kept in a Pyrex flask heated at 60° C. and agitated during 15 days. The resulting faujasite had the following molar composition:

0.67 $Na_2O$; 0.35 $K_2O$; $Al_2O_3$; 3.1 $SiO_2$; 6.2 $H_2O$

After dehydration, as in Example 1, it adsorbed 28.2 g. of water at 25° C. under a partial pressure of water vapor of 13.5 mm. Hg.

Example 3

Following Example 2, a mixture of the same composition was prepared from 11.3 g. of dried gel. The mixture was allowed to stand for 40 hours at 25° C., then heated to 95° C. for 12 hours without stirring. The resultant Na-K faujasite had the following molar composition:

0.69 Na$_2$O; 0.35 K$_2$O; 1.0 Al$_2$O$_3$; 3.0 SiO$_2$; 6.3 H$_2$O

When dehydrated as in Example 1, it adsorbed 20% of n-hexane at 25° C. under a partial pressure of 102 mm. Hg.

It is clear from the description of the invention that each step in the process is useful in itself insofar as each intermediate step produces an intermediate composition which can be stored, sold, or used. For example, it is apparent that the composition obtained just prior to crystallization can be refrigerated to a point that the rate of crystallization is so slow that the product would be considered to have a satisfactory shelf life.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of zeolites of the faujasite type comprising:
  (a) forming a gel from a mixture having the following molar ratios and containing the total quantity of alumina necessary:

SiO$_2$/Al$_2$O$_3$ ---------------- 1.5:1 to 3:1.
   Na$_2$O+K$_2$O/Al$_2$O$_3$ ---------- 0.8:1 to 3.5:1.
   H$_2$O/Al$_2$O$_3$ ---------------- 7:1 to 300:1.

(b) adding to resultant gel sufficient amorphous silica having a particle size less than 100 microns to increase the SiO$_2$ moles by at least 0.5 mole per mole of Al$_2$O$_3$, optionally increasing at least one of the Na$_2$O, K$_2$O and H$_2$O levels in the composition of said gel, to form an amorphous mixture having the following molar ratios:

SiO$_2$/Al$_2$O$_3$ ---------------- 2.5:1 to 8:1.
   Na$_2$O+K$_2$O/Al$_2$O$_3$ ---------- 3:1 to 8:1.
   K$_2$O/Na$_2$O+K$_2$O ------------ 0.5:1 to 0.7:1.
   H$_2$O/Al$_2$O$_3$ ---------------- 75:1 to 300:1.

(c) and precipitating a crystallized faujasite from said amorphous mixture at 20–105° C.

2. A process as defined by claim 1 wherein the molar ratios in the amorphous mixture of step (a) are:

SiO$_2$/Al$_2$O$_3$ ---------------- 2:1 to 2.5:1.
   Na$_2$O+K$_2$O/Al$_2$O$_3$ ---------- 1:1 to 3:1.
   H$_2$O/Al$_2$O$_3$ ---------------- 100:1 to 200:1.

3. A process as defined by claim 1 wherein the molar ratios in the amorphous mixture of step (b) are:

SiO$_2$/Al$_2$O$_3$ ---------------- 3:1 to 6:1.
   Na$_2$O+K$_2$O/Al$_2$O$_3$ ---------- 3.5:1 to 6.5:1.
   K$_2$O/Na$_2$O+K$_2$O ------------ 0.1:1 to 0.6:1.
   H$_2$O/Al$_2$O$_3$ ---------------- 100:1 to 200:1.

4. A process as defined by claim 1 wherein step (a) is conducted by adding a solution of a silicate selected from the group consisting of sodium silicate, potassium silicate and mixtures thereof, with an aqueous solution of sodium aluminate.

5. A process as defined by claim 1 wherein said amorphous silica has a particle size of below 50 microns.

6. A process for the preparation of zeolites of the faujasite type comprising:
  (a) adding amorphous silica of a particle size less than 100 microns to a gel formed from a mixture having the following molar ratios containing the total quantity of alumina necessary:

SiO$_2$/Al$_2$O$_3$ ---------------- 1.5:1 to 3:1.
   Na$_2$O+K$_2$O/Al$_2$O$_3$ ---------- 0.8:1 to 3.5:1.
   H$_2$O/Al$_2$O$_3$ ---------------- 75:1 to 300:1.

said amorphous silica being added in a proportion of at least 0.5 mol SiO$_2$ per mol of Al$_2$O$_3$ to increase the ratio of SiO$_2$/Al$_2$O$_3$ to not higher than 8:1 and to form an amorphous mixture from which a faujasite zeolite can be crystallized, and (b) and precipitating a crystallized faujasite from said amorphous mixture at 20–105° C.

7. A process for the preparation of zeolites of the faujasite type which comprises:
  crystallizing at 20–105° C. a faujasite zeolite from an amorphous mixture of a gel admixed with amorphous silica of less than 100 microns, said amorphous mixture having at least 0.5 mol of said amorphous silica per mole of Al$_2$O$_3$, all of said Al$_2$O$_3$ being present in said gel; said amorphous mixture having the following molar ratios:

SiO$_2$/Al$_2$O$_3$ ---------------- 2.5:1 to 8:1.
   Na$_2$O+K$_2$O/Al$_2$O$_3$ ---------- 3:1 to 8:1.
   K$_2$O/Na$_2$O+K$_2$O ------------ 0.05:1 to 0.7:1.
   H$_2$O/Al$_2$O$_3$ ---------------- 75:1 to 300:1.

8. A process as defined by claim 7, said crystallizing comprising maintaining the amorphous mixture at 20–30° for 24 to 72 hours and further crystallizing the mixture at above 30° C.

References Cited
UNITED STATES PATENTS

| | | | |
|---|---|---|---|
| 3,374,058 | 3/1968 | McDaniel et al. | 423—329 |
| 3,492,090 | 1/1970 | Jenkins | 423—329 |
| 3,510,258 | 5/1970 | Hindin et al. | 423—329 |
| 3,415,736 | 12/1968 | Ciric | 423—329 X |

EDWARD J. MEROS, Primary Examiner

UNITED STATES PATENT OFFICE
CERTIFICATE OF CORRECTION

Patent No. 3,767,771　　　　　Dated October 23, 1973

Inventor(s)　　JEAN-LOUIS GUTH ET AL

It is certified that error appears in the above-identified patent and that said Letters Patent are hereby corrected as shown below:

Column 1, line 29, in the Background of the Invention:

"$AlO_6$" should be --$AlO_4$--.

Column 5, line 35, in Claim 1: "7:1" should be --75:1--.

, line 53, in Claim 2: delete "in the amorphous mixture of" and insert -- of the mixture in --

Signed and sealed this 17th day of September 1974.

(SEAL)
Attest:

McCOY M. GIBSON, JR.　　　　　C. MARSHALL DANN
Attesting Officer　　　　　　　Commissioner of Patents